June 25, 1968 L. D. GARDNER 3,389,682

HIGH SPEED VACUUM CHUCK

Filed March 14, 1966

INVENTOR
L. D. GARDNER
BY R. E. Anderson
ATTORNEY

United States Patent Office 3,389,682

Patented June 25, 1968

3,389,682

HIGH SPEED VACUUM CHUCK

Lawrence D. Gardner, Bloomfield, N.J., assignor to Bell Telephone Laboratories, Incorporated, New York, N.Y., a corporation of New York Filed Mar. 14, 1966, Ser. No. 533,897
6 Claims. (Cl. 118—52)

This invention relates to mechanical chucks, and more particularly, to high speed rotating vacuum chucks.

One step in the photo-etch fabrication of many modern electronic devices is the formation of a thin coating of liquid over the surface of a small solid substrate. For example, in the fabrication of thin film circuits on ceramic substrates, a thin coating of liquid photoresist material must be evenly formed over the upper surface of the substrate. A uniformly thin distribution of the photoresist liquid is best accomplished by rotating the substrate at a high rate of speed to spread the liquid over the upper surface. Unfortunately, present chucks for holding the substrate during rotation usually comprise some sort of mechanical holder that interferes with the free spin-off of liquid material from the surface being coated. Other chucks that have been proposed are mechanically complicated and expensive. Adhesives are impractical because they complicate the fabrication process and tend to contaminate the substrate.

Accordingly, it is an obect of this invention to provide a relatively inexpensive chuck for rotating small substrates at a high rate of speed without interfering with the free spin-off of liquid material from an upper surface of such substrates.

These and other objects of the invention are attained in an illustrative embodiment thereof comprising a cover plate for holding a small substrate which overlays a rotary centrifugal impeller. The substrate is contained within a small cavity or indentation in the cover plate and overlays a central aperture through the cover plate. As the impeller and cover plate rotate, air is forced out from the region below the substrate, thereby establishing a suction force on the substrate that increases with rotational speed and thus holding the substrate securely in place. The top surface of the substrate extends above the cover plate; there is therefore no interference with the free spin-off of liquid material from the top surface during rotation.

In accordance with another feature, a resilient washer is included in the cover plate cavity surrounding the aperture. The substrate rests on the washer and is forced downwardly by the vacuum or suction forces created by the impeller. The resilient washer distributes the suction forces so that the substrate is held securely in position even if its bottom surface is irregular.

These and other objects and features of the invention will be better appreciated from the consideration of the following detailed description, taken in conjunction with the accompanying drawing in which.

Figure 1:
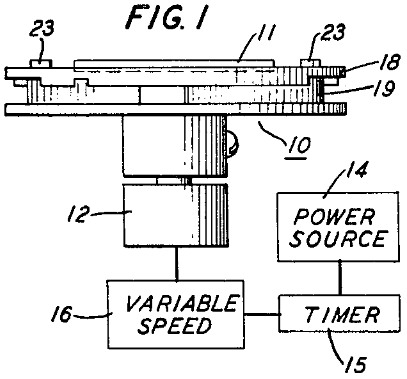
FIG. 1 is a side view of an illustrative embodiment of the invention.
Figure 2:
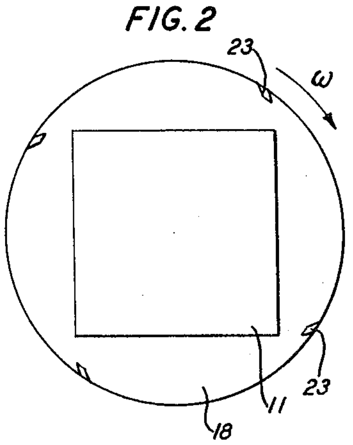
FIG. 2 is a top view of the embodiment of FIG. 1.

Referring now to FIGS. 1 and 2, there is shown a vacuum chuck 10 in accordance with the invention for holding a substrate 11 and rotating it at a high rate of speed. The chuck is driven in the direction of the arrow $\omega$ of FIG. 2 by a conventional motor 12. The purpose of the high speed rotation is to disperse evenly over the upper surface of substrate 11 a liquid such as liquid photoresist material. It can be seen that the radial centrifugal forces on liquid that has been dropped or sprayed on the substrate spreads the liquid over the entire upper surface. The formation of an extremely thin even coating requires that the liquid be allowed to spin off freely from the substrate 11 during rotation. The motor 12 is energized by a power source 14 and is controlled by a conventional timer 15 and a variable speed control device 16. For the application of certain modern photoresist materials, it is desirable that the substrate be rotated at speeds approaching 18,000 rotations per minute.

Figure 3:
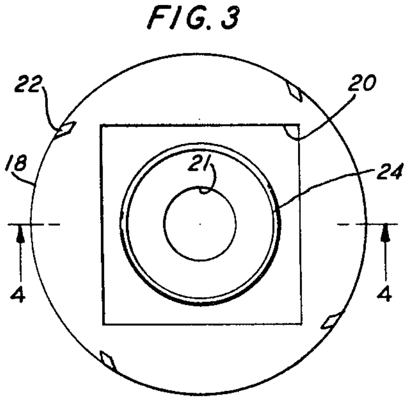
FIG. 3 is a top view of a cover plate of the device of FIG. 1.
Figure 4:
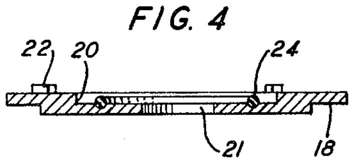
FIG. 4 is a view taken along lines 4—4 of FIG. 3.
Figure 5:
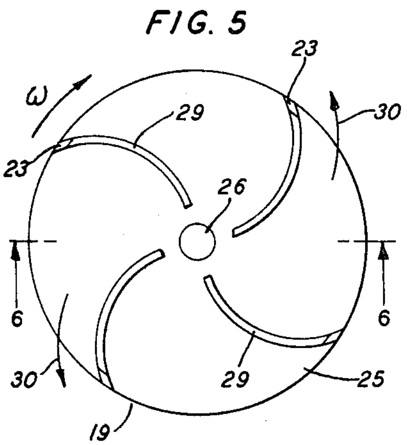
FIG. 5 is a top view of the centrifugal impeller of the device of FIG. 1.
Figure 6:
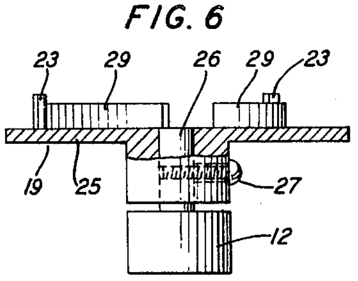
FIG. 6 is a sectional view taken along lines 6—6 of FIG. 5.

The chuck 10 comprises a cover plate 18 shown on FIGS. 3 and 4, and a centrifugal impeller 19 shown in detail on FIGS. 5 and 6. Referring to FIG. 3, an indentation or cavity 20 is formed in the upper surface of cover plate 18 for containing the substrate 11 of FIG. 1. Centrally located in the cover plate is an aperture 21. A plurality of key ways 22 are located around the periphery of the cover plate for engaging key projections 23 of the centrifugal impeller as shown in FIG. 1. A resilient washer 24 is imbedded in the cover plate and extends upwardly just above the surface of the cover plate cavity as shown in FIGS. 3 and 4.

As shown in FIGS. 5 and 6, the centrifugal impeller 19 comprises a mounting plate 25 mounted on a rotatable shaft 26 of the motor 12 by a pair of set screws 27. Located on an upper surface of the mounting plate are four curved vanes 29. The ends of the vanes form the key projections 23 which engage the cover plate. As the assembly of FIG. 1 is rotated, the impeller vanes force air to flow outwardly from the device as shown by the arrows 30 of FIG. 5. Air is thereby drawn through the aperture 21 of the cover plate to create a partial vacuum beneath the substrate 11 that is contained within the cover plate. As a result, a suction force is exerted on the substrate 11 tending to hold it firmly within the cover plate cavity 20. As the speed of rotation increases, the air expelled by the impeller vanes increases, thereby increasing the suction forces on the substrate 11. It is understood, of course, that the suction forces result from the atmospheric pressure on the upper surface of substrate 11 with respect to a partial vacuum formed along the lower surface.

The resilient washer 24 is included to maintain the differential atmospheric pressure on the top surface of the substrate, and effectively constitutes a seal. In the absence of the washer, the suction forces on the substrate may be uneven, particularly if the bottom surface of the substrate is irregular, which could cause air to flow around the substrate into the cover plate aperture 21 thereby breaking the vacuum seal. With the resilient washer, the forces on the substrate are distributed and equalized, and the partial vacuum beneath the substrate is maintained during operation.

As shown in FIG. 6, the vanes 29 are curved approximately in the shape of arcs having angular directions that are opposite the angular direction of rotation $\omega$. This configuration enhances the flow of air shown by the arrows 30 and minimizes air turbulences.

It can be seen that with my vacuum chuck, a substrate can be securely held in position and rotated at a high rate of speed without interfering with the free distribution of liquid over the entire upper surface. The substrate is held securely at increasingly high rates of rotational speed because the suction forces on the substrate increase as the speed increases. Different cover plates having different size cavities 20 can easily be fitted over the centrifugal impeller for accommodating different size substrates. If so desired, each cover plate can include a number of cavity indentations for accommodating a number of substrates. Further, the cover plate and impeller could be molded as a single integral structure if so desired.

Various other modifications and embodiments may be made by those skilled in the art without departing from the spirit and scope of the invention.

What is claimed is:

1. A device for distributing a thin liquid film over a top surface of a member comprising:

a cover plate having a cavity in a top surface thereof for receiving the member;

the cavity having a depth that is smaller than the thickness of the member, whereby the inserted member protrudes upwardly from the cover plate;

an aperture within the cavity that extends through the cover plate;

a centrifugal impeller mounted below the cover plate;

means associated with the impeller adapted to secure the cover plate to the impeller; and means for rotating the cover plate and impeller at a high speed, thereby to develop a suction force on the member for holding it in place on the cover plate while rotating it to distribute liquid over the top surface of the member.

2. The device of claim 1 wherein:

the impeller comprises four outwardly extending vanes arranged in quadrature each having a key projeciton at the vane tip;

and the cover plate includes four key ways located in the cover plate periphery for engaging the key projections.

3. The device of claim 1 wherein:

the aperture is centrally located in the cavity;

and further comprising an elastic washer included in the cavity and surrounding the aperture for equalizing suction forces on the sample.

4. The device of claim 1 wherein:

the centrifugal impeller comprises a flat mounting plate mounted on a rotatable shaft and a plurality of impeller vanes mounted on the mounting plate;

the vanes each describe substantially an arc of a circle and extend from a point near the center of the mounting plate to the periphery of the mounting plate.

5. The device of claim 4 wherein:

the vanes are each curved in a first angular direction;

and the rotating means comprises means for driving the centrifugal impeller in a second angular direction that is opposite the first angular direction, thereby to minimize air turbulence and to enhance air flow in the device.

6. The device of claim 5 wherein.

the aperture is centrally located in the cavity;

and further comprising an elastic washer included in the cavity and surrounding the aperture for equalizing the suction forces on the sample.

References Cited

UNITED STATES PATENTS

| | | | |
|---|---|---|---|
| 504,597 | 9/1893 | Levy | 118—52 |
| 1,198,402 | 9/1916 | Bagnall. | |
| 1,206,693 | 11/1916 | Gillett | 118—52 X |
| 2,366,935 | 1/1945 | Schmid | 269—21 X |
| 2,387,349 | 10/1945 | Powers | 118—52 X |
| 2,398,959 | 4/1946 | Petry | 279—3 |
| 2,512,274 | 6/1950 | Hawk | 279—3 |
| 2,469,817 | 5/1949 | Eriksson | 279—3 |
| 2,580,131 | 12/1951 | Rowell | 118—52 X |
| 2,852,264 | 9/1958 | Granata | 279—3 |
| 2,941,499 | 6/1960 | Gutzmer | 118—52 X |
| 3,131,476 | 5/1964 | Seher | 33—41 |

FOREIGN PATENTS

| | | |
|---|---|---|
| 659,499 | 2/1929 | France. |
| 423,900 | 2/1935 | Great Britain. |
| 536,858 | 5/1941 | Great Britain. |

MORRIS KAPLAN, *Primary Examiner.*